US 8,199,831 B2

(12) United States Patent
Correa et al.

(10) Patent No.: US 8,199,831 B2
(45) Date of Patent: Jun. 12, 2012

(54) METHOD AND DEVICE FOR CODING VIDEO LEVELS IN A PLASMA DISPLAY PANEL

(75) Inventors: Carlos Correa, Villingen-Schwenningen (DE); Sebastien Weltbruch, Kappel (DE); Mohammed Abdallah, Cairo (EG)

(73) Assignee: Thomson Licensing, Issy-les-Moulineaux (FR)

( * ) Notice: Subject to any disclaimer, the term of this patent is extended or adjusted under 35 U.S.C. 154(b) by 512 days.

(21) Appl. No.: 12/225,600

(22) PCT Filed: Apr. 2, 2007

(86) PCT No.: PCT/EP2007/053154
§ 371 (c)(1),
(2), (4) Date: Nov. 17, 2009

(87) PCT Pub. No.: WO2007/113275
PCT Pub. Date: Oct. 11, 2007

(65) Prior Publication Data
US 2010/0053200 A1    Mar. 4, 2010

(30) Foreign Application Priority Data

Apr. 3, 2006   (EP) .................................. 06290544
May 22, 2006  (EP) .................................. 06290828

(51) Int. Cl.
*H04N 7/12*      (2006.01)
*H04N 11/02*     (2006.01)
*H04N 11/04*     (2006.01)
*G09G 5/02*      (2006.01)

(52) U.S. Cl. ............... 375/240.26; 375/240.01; 345/600

(58) Field of Classification Search .................. None
See application file for complete search history.

(56) References Cited

U.S. PATENT DOCUMENTS

| 5,737,453 | A  | * | 4/1998  | Ostromoukhov ............. 382/275 |
| 6,008,793 | A  | * | 12/1999 | Shigeta ......................... 345/204 |
| 6,178,272 | B1 | * | 1/2001  | Segman ........................ 382/298 |
| 6,940,474 | B2 | * | 9/2005  | Weitbruch et al. ............. 345/60 |
| 7,339,632 | B2 | * | 3/2008  | Weitbruch et al. ............. 348/797 |
| 2008/0130759 | A1 | * | 6/2008 | Weitbruch et al. ....... 375/240.26 |
| 2008/0204372 | A1 | * | 8/2008 | Correa et al. ................... 345/60 |

FOREIGN PATENT DOCUMENTS

EP          1522964        4/2005

OTHER PUBLICATIONS

R.A. Ulichney: "Dithering With Blue Noise" Proceedings of the IEEE, US, vol. 76, No. 1, Jan. 1988, pp. 56-79, XP002034911.
Search Report Jun. 28, 2007.

\* cited by examiner

*Primary Examiner* — David Czekaj
*Assistant Examiner* — Kevin McInnish
(74) *Attorney, Agent, or Firm* — Myers Wolin, LLC

(57) ABSTRACT

The invention relates to a method and a device for coding video levels of pixels of a color component of a picture to be displayed on a display device into code words. The invention is more particularly applicable to Plasma Display Panels (PDP) to improve the picture quality (grayscale enhancement, dynamic false contour reduction). The main idea of the invention is to automatically change the floor and ceiling levels used classically for dithering each pixel value depending on the neighboring pixels of the same color component. The size of the window determining the neighboring pixels is dependent on the definition of the wanted flat field size.

6 Claims, 12 Drawing Sheets

METHOD AND DEVICE FOR CODING VIDEO LEVELS IN A PLASMA DISPLAY PANEL

This application claims the benefit, under 35 U.S.C. §365 of International Application PCT/EP2007/053154, filed Apr. 2, 2007, which was published in accordance with PCT Article 21(2) on Oct. 11, 2007 in English and which claims the benefit of European patent application No. 06290544.3, filed Apr. 3, 2006 and European patent application No. 06290828.0, filed May 22, 2006.

FIELD OF THE INVENTION

The invention relates to a method and a device for coding video levels of pixels of a colour component of a picture to be displayed on a display device into code words. The invention is more particularly applicable to Plasma Display Panels (PDP) to improve the picture quality (grayscale enhancement, dynamic false contour reduction).

BACKGROUND OF THE INVENTION

Though they are known for many years, plasma display panels are encountering a growing interest from TV manufacturers. Indeed, this technology now makes it possible to achieve flat color panel of large size (out of the CRT limitations) and with very limited depth without any viewing angle constraints. Referring to the last generation of European TV, a lot of work has been made to improve its picture quality. Consequently, a new technology like the plasma one has to provide a picture quality as good as or better than the old standard TV technology.

On the one hand, the Plasma technology gives the possibility of "unlimited" screen size, of attractive thickness, but on the other hand, it generates new kinds of artifacts, which could reduce the picture quality. Most of these artifacts are different than those of CRT screen and so more visible since people are used to seeing old TV artifacts unconsciously. One of these artifacts called "dynamic false contour effect" is described in detail hereinafter. Generally, a Plasma Display Panel (PDP) utilizes a matrix array of discharge cells, which could only be "ON" or "OFF". Therefore, unlike a CRT or LCD in which grey levels are expressed by analogue control of the light emission, a PDP controls grey level by a Pulse Width Modulation (PWM) of each cell. This time-modulation is integrated by the eye over a period corresponding to the eye time response. The more often a cell is switched on in a given time frame, the higher is its luminance (brightness). For example, when disposing of 8 bit luminance levels (256 levels per colour, so 16.7 million colours), each level can be represented by a combination of the 8 following bits:

1-2-4-8-16-32-64-128

To realize such a coding, the frame period can be divided in 8 lighting sub-periods (called sub-fields), each corresponding to a bit and a brightness level. The number of light pulses for the bit "2" is the double as for the bit "1" etc. With these 8 sub-periods, it is possible through combination to build the 256 grey levels. The eye of an observer integrates over a frame period these sub-periods to catch the impression of the right grey level. FIG. 1 presents this decomposition.

The light emission pattern introduces new categories of image-quality degradation corresponding to disturbances of grey levels and colours. These are defined as "dynamic false contour effect" since they correspond to disturbances of grey levels and colours in the form of an apparition of coloured edges in the picture when an observation point on the plasma panel moves. Such failures on a picture lead to the impression of strong contours appearing on homogeneous areas. The degradation is enhanced when the image has a smooth gradation (like skin) and when the light-emission period exceeds several milliseconds.

When an observation point (eye focus area) on the PDP screen moves, the eye follows this movement. Consequently, it does no more integrate the same cell over a frame (static integration) but it integrates information coming from different cells located on the movement trajectory and it mixes all these light pulses together, which leads to a faulty signal information.

Basically, the false contour effect occurs when there is a transition from one level to another with a totally different code. So the first point is to select, from a code (with n sub-fields) which permits to achieve p grey levels (typically p=256), m grey levels (with m<p) among the $2^n$ possible sub-fields arrangements (when working at the encoding) or among the p grey levels (when working at the video level) so that close levels have close sub-fields arrangements.

The second point is to keep a maximum of levels in order to keep a good video quality. To this end the minimum of chosen levels should be equal to twice the number of subfields. For all further examples, a 11 sub-fields mode defined as following is used:

1 2 3 5 8 12 18 27 41 58 80.

For these issues the Gravity Centre Coding (GCC) was introduced in document EP 1 256 924. The content of this document is expressively incorporated by reference herewith.

As seen previously, the human eye integrates the light emitted by Pulse Width Modulation. So if one considers all video levels encoded with a basic code, the time position of these video levels (the centre of gravity of the light) is not growing continuously with the video level as shown in FIG. 2.

The centre of gravity CG2 for a video level 2 is larger than the centre of gravity CG1 of video level 1 and the centre of gravity CG3 of video level 3 is smaller than that of video level 2.

This introduces false contour. The centre of gravity is defined as the centre of gravity of the subfields 'on' weighted by their sustain weight:

$$CG(\text{code}) = \frac{\sum_{i=1}^{n} sfW_i * \delta_i(\text{code}) * sfCG_i}{\sum_{i=1}^{n} sfW_i * \delta_i(\text{code})}$$

where $sfW_i$ is the subfield weight of $i^{th}$ subfield, $\delta_i$ is equal to 1 if the $i^{th}$ subfield is 'on' for the chosen code, 0 otherwise and $SfCG_i$ is the centre of gravity of the $i^{th}$ subfield, i.e. its time position, as shown in FIG. 3 for the first seven sub-fields.

The temporal centres of gravity of the 256 video levels for the 11 subfields code chosen here can be represented as shown in FIG. 4.

The curve is not monotonous and presents a lot of jumps. These jumps correspond to false contour. According to GCC, these jumps are suppressed by selecting only some levels, for which the gravity centre grows continuously with the video levels apart from exceptions in the low video level range up to a first predefined limit and/or in the high video level range from a second predefined limit on. This can be done by tracing a monotone curve without jumps on the previous graphic, and selecting the nearest point as shown in FIG. 5. Thus, not all possible video levels are used when employing GCC.

In the low video level region it should be avoided to select only levels with growing gravity centre because the number of possible levels is low and so if only growing gravity centre levels were selected, there would not be enough levels to have a good video quality in the black levels since the human eye is very sensitive in the black levels. In addition the false contour in dark areas is negligible.

In the high level region, there is a decrease of the gravity centres. So there is a decrease also in the chosen levels, but it is not important since the human eye is not sensitive in the high level. In these areas, the eye is not capable to distinguish different levels and the false contour level is negligible regarding the video level (the eye is only sensitive to relative amplitude if the Weber-Fechner law is considered). For these reasons, the monotony of the curve is necessary just for the video levels between 10% and 80% of the maximal video level.

In this case, for this example, 38 levels (m=38) are selected among the 256 possible. These 38 levels permit to keep a good video quality (grey-scale portrayal).

On one hand, the GCC concept enables a visible reduction of the false contour effect. On the other hand, it introduces noise in the picture in the form of dithering needed since less levels are available than required. The missing levels are then rendered by means of spatial and temporal mixing of available GCC levels. The false contour effect is an artifact that only appears on specific sequences (mostly visible on large skin area) whereas the introduced noise is visible all the time and can give an impression of noisy display. For that reason, it is important to use the GCC method only if there is a risk of false contour artifacts.

Document EP 1 376 521 introduces a solution for this based on a motion detection enabling to switch ON or OFF the GCC depending on whether there is or not a lot of motion in the picture.

Document EP 1 522 964 discloses also a method for processing video pictures wherein each video picture is divided into areas of at least two types according to the video gradient of the picture. A specific video gradient range is allocated to each type of area. For each type of area, a specific code reducing false contour effects is used to encode the pixel of this area. For example, areas of a first type are encoded with a classical coding (255 video levels) and areas of a second type are encoded with a GCC coding (40 video levels).

As shown, the most effective solution to reduce or to eliminate dynamic false contour is to sacrifice the gray level quality, i.e. to choose a carefully selected smaller code set and use dithering to obtain all the wanted video levels, as for the GCC coding. But since the coding operation and the dithering operation are carried out independently, dithering noise is not optimized.

SUMMARY OF THE INVENTION

The invention proposes a new coding method enabling to select a better coding scheme in terms of noise and dynamic false contour for every area of the picture.

The main idea of the invention is to automatically change floor and ceiling levels used classically for dithering each pixel value depending on the neighboring pixels of the same color component. The size of the window determining the number of neighboring pixels is dependent on the definition of the wanted flat field size.

According to the invention, this object is solved by the method described in the appended claims.

More particularly, the invention concerns a method for coding the video level of a current pixel of a colour component of a picture to be displayed on a display device into a code word belonging to at least a first code set and/or a second code set, the second code set being a subset of the first code set, the code words of the second code set being selected among the code words of the first code set according to the rule that the temporal centre of gravity for the light generation of the corresponding sub-field code words grows continuously with the video level of said code words apart from exceptions in the low video level range up to a first predetermined limit and/or for in the high video level range from a second predetermined limit on, comprising the following steps:

determining, for a predetermined number of neighbouring pixels belonging to a window including the current pixel, at least a first floor level and a first ceiling level that can be coded by a code word of the first code set and a second floor level and a second ceiling level that can be coded by a code word of the second code set, the first and second floor levels being respectively the highest video level among the video levels corresponding to the code words of the first and second code sets equal to or lower than the video level of the current pixel and the first and second ceiling levels being respectively the lowest video level among the video levels corresponding to the code words of the first and second code sets equal to or higher than the video level of the current pixel, determining, for the current pixel, the minimum level between the first floor level of the current pixel and the ceiling levels of the predetermined number of neighbouring pixels of the window including the current pixel and determining, for the current pixel, the maximum level between the first floor ceiling of the current pixel and the floor levels of the predetermined number of neighbouring pixels, the minimum level being called floor level of the current pixel and the maximum level being called ceiling level of the current pixel, substituting, for the current pixel, the floor level by the second floor level if the floor level is lower than the second floor level and the ceiling level by the second ceiling level if the ceiling level is lower than the second ceiling level, and selecting, for the current pixel, the code word among the code word of the floor level and the code word of the ceiling level according to a predetermined criteria for coding the video level of the current pixel.

It further comprises a step for encoding, for the current pixel, the selected code word into a subfield code word, wherein to each bit of the subfield code word a certain duration is assigned, hereinafter called sub-field, during which a pixel can be activated for light generation.

Preferably, the step of selecting the code word of the current pixel among the code word of the floor level and the code word of the ceiling level according to a predetermined criteria comprises the following steps:

computing a coefficient $\alpha$ such that $I(x_p) = \alpha \cdot C(x_p) + (1-\alpha) \cdot F(x_p)$ where $I(x_p)$ is the video level of the current pixel $x_p$, $C(x_p)$ is the ceiling level of the current pixel, and $F(x_p)$ is the floor level of the current pixel, generating a random number $N_{rnd}$ such that $0 \leq N_{rnd} \leq 1$, selecting the ceiling level $C(x_p)$ if the coefficient $\alpha$ is greater than or equal to $N_{rnd}$ and selecting the floor level $F(x_p)$ if the coefficient $\alpha$ is lower than the random number $N_{rnd}$.

The invention concerns also a device for coding the video level of a current pixel of a colour component of a picture to be displayed on a display device into a code word belonging to at least a first code set and/or a second code set, the second code set being a subset of the first code set, the code words of the second code set being selected among the code words of the first code set according to the rule that the temporal centre of gravity for the light generation of the corresponding sub-field code words grows continuously with the video level of said code words apart from exceptions in the low video level range up to a first predetermined limit and/or for in the high video level range from a second predetermined limit on. The device comprises:

means for determining, for a predetermined number of neighbouring pixels belonging to a window including said current pixel, at least a first floor level and a first ceiling level that can be coded by a code word of the first code set and a second floor level and a second ceiling level that can be coded by a code word of the second code set, the first and second floor levels being respectively the highest video level among the video levels corresponding to the code words of the first and second code sets equal to or lower than the video level of the current pixel and the first and second ceiling levels being respectively the lowest video level among the video levels corresponding to the code words of the first and second code sets equal to or higher than the video level of the current pixel, means for determining, for said current pixel, the minimum level between the first floor level of said current pixel and the ceiling levels of said predetermined number of neighbouring pixels of the window including the current pixel and determining, for said current pixel, the maximum level between the first floor ceiling of said current pixel and the floor levels of said predetermined number of neighbouring pixels, said minimum level being called floor level of the current pixel and said maximum level being called ceiling level of the current pixel, means for substituting, for said current pixel, the floor level by the second floor level if said floor level is lower than the second floor level and the ceiling level by the second ceiling level if said ceiling level is lower than the second ceiling level, and dithering means for selecting, for said current pixel, the code word among the code word of the floor level and the code word of the ceiling level according to a predetermined criteria for coding the video level of the current pixel.

BRIEF DESCRIPTION OF THE DRAWINGS

Exemplary embodiments of the invention are illustrated in the drawings and in more detail in the following description. The drawings showing in.

DESCRIPTION OF PREFERRED EMBODIMENTS

Figure 1:
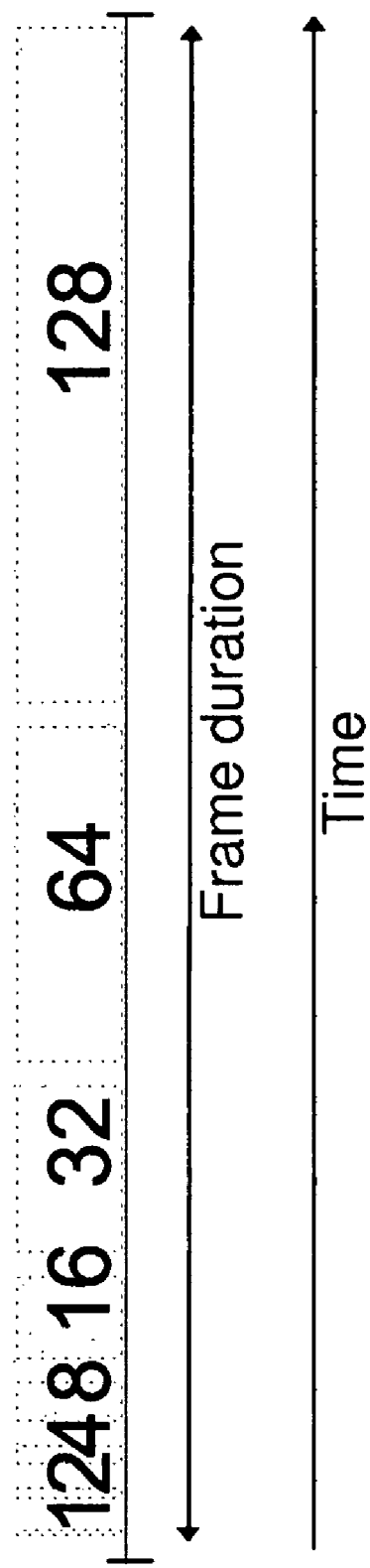
FIG. 1 a classical composition of a frame period for the binary code.
Figure 2:
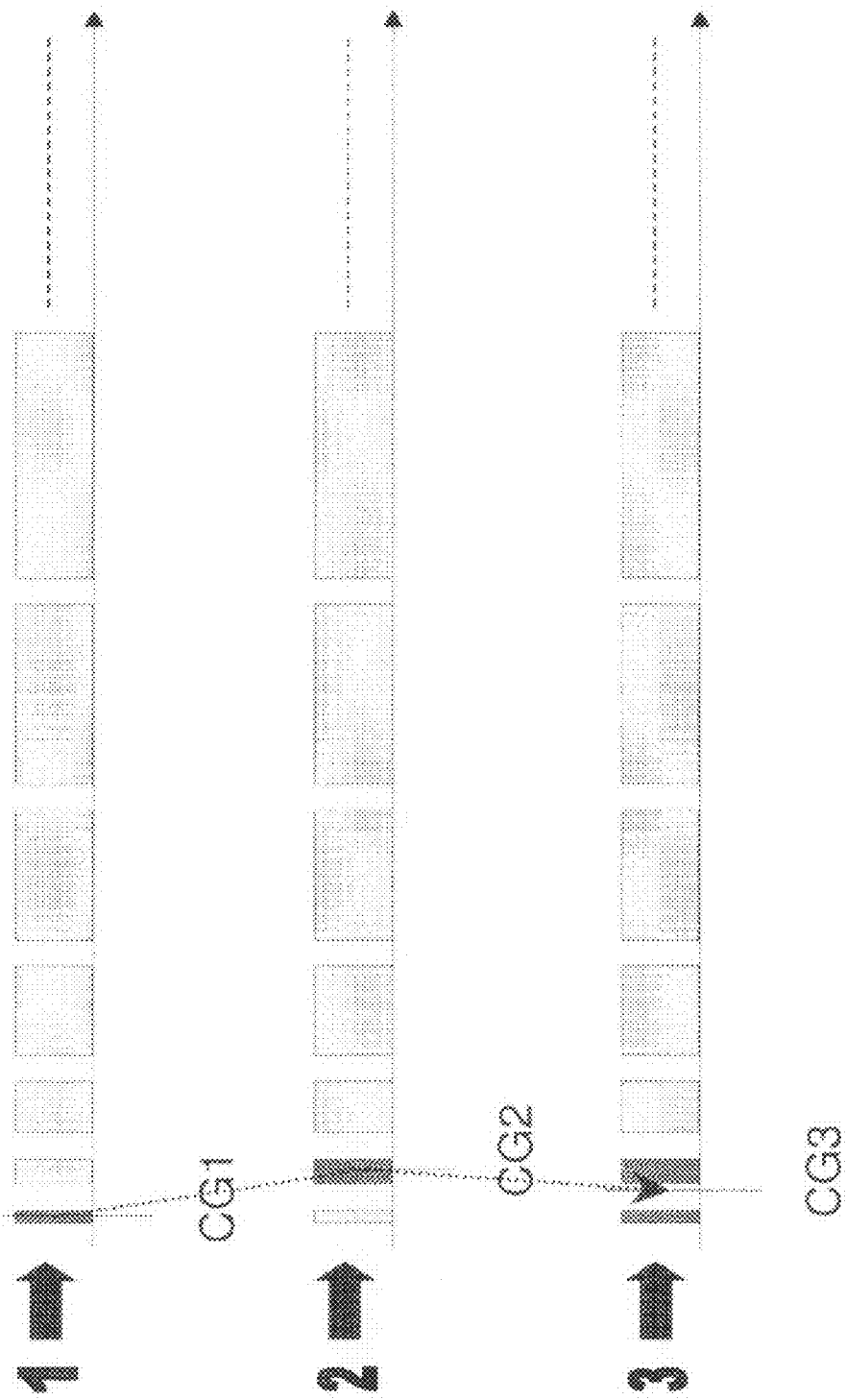
FIG. 2 the centre of gravity of the video levels 1, 2 and 3 for a frame composition as illustrated by FIG. 1.
Figure 3:
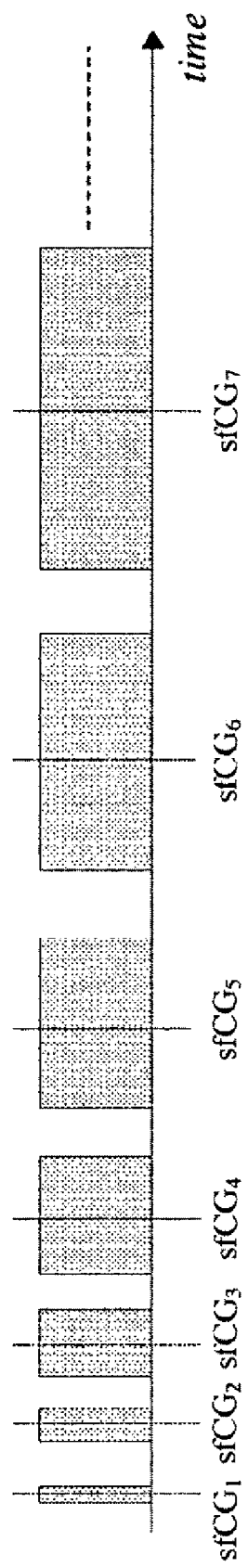
FIG. 3 the centre of gravity of sub-fields of the composition of FIG. 1.
Figure 4:
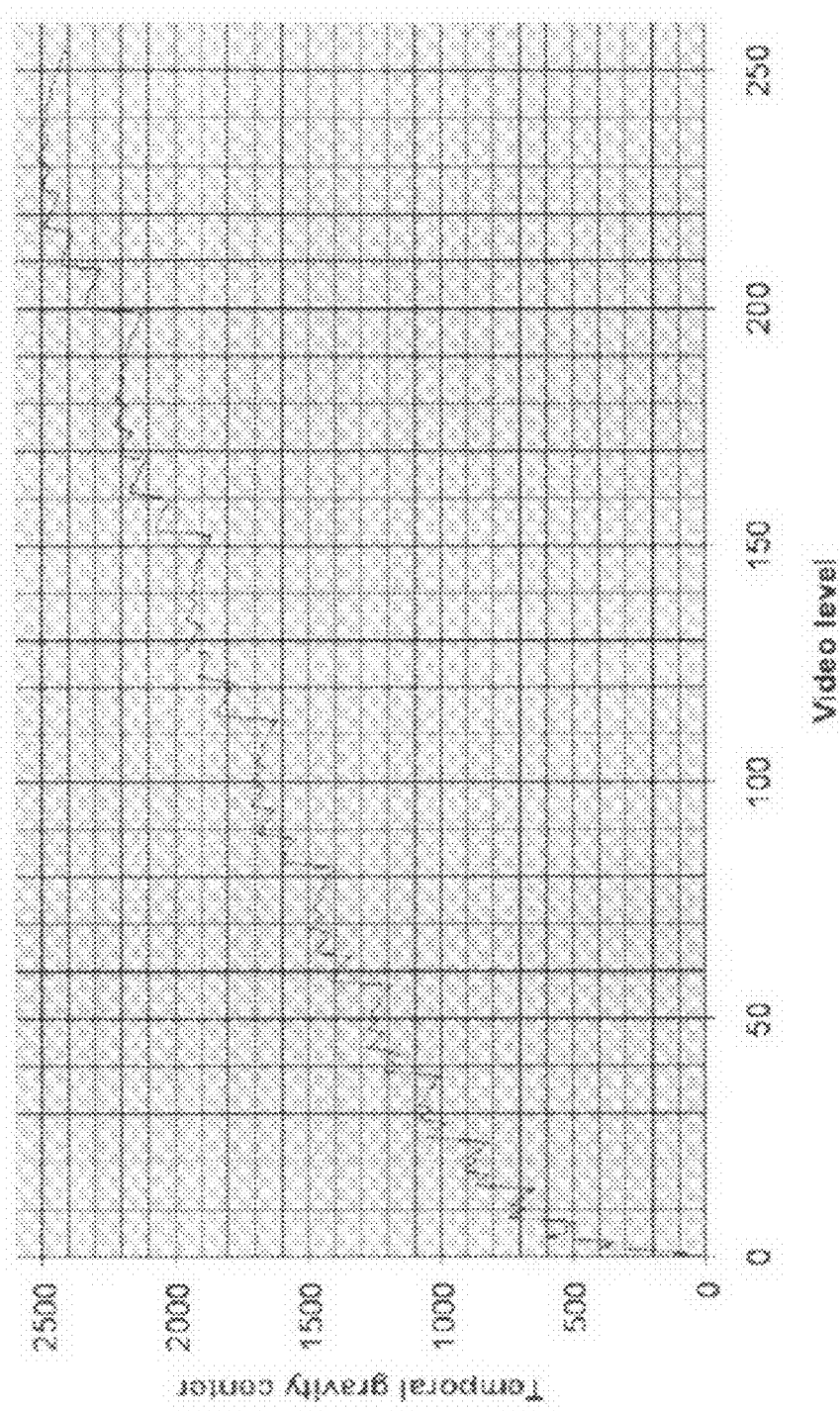
FIG. 4 a graph showing the temporal gravity centre of video levels from 0 to 255.
Figure 5:
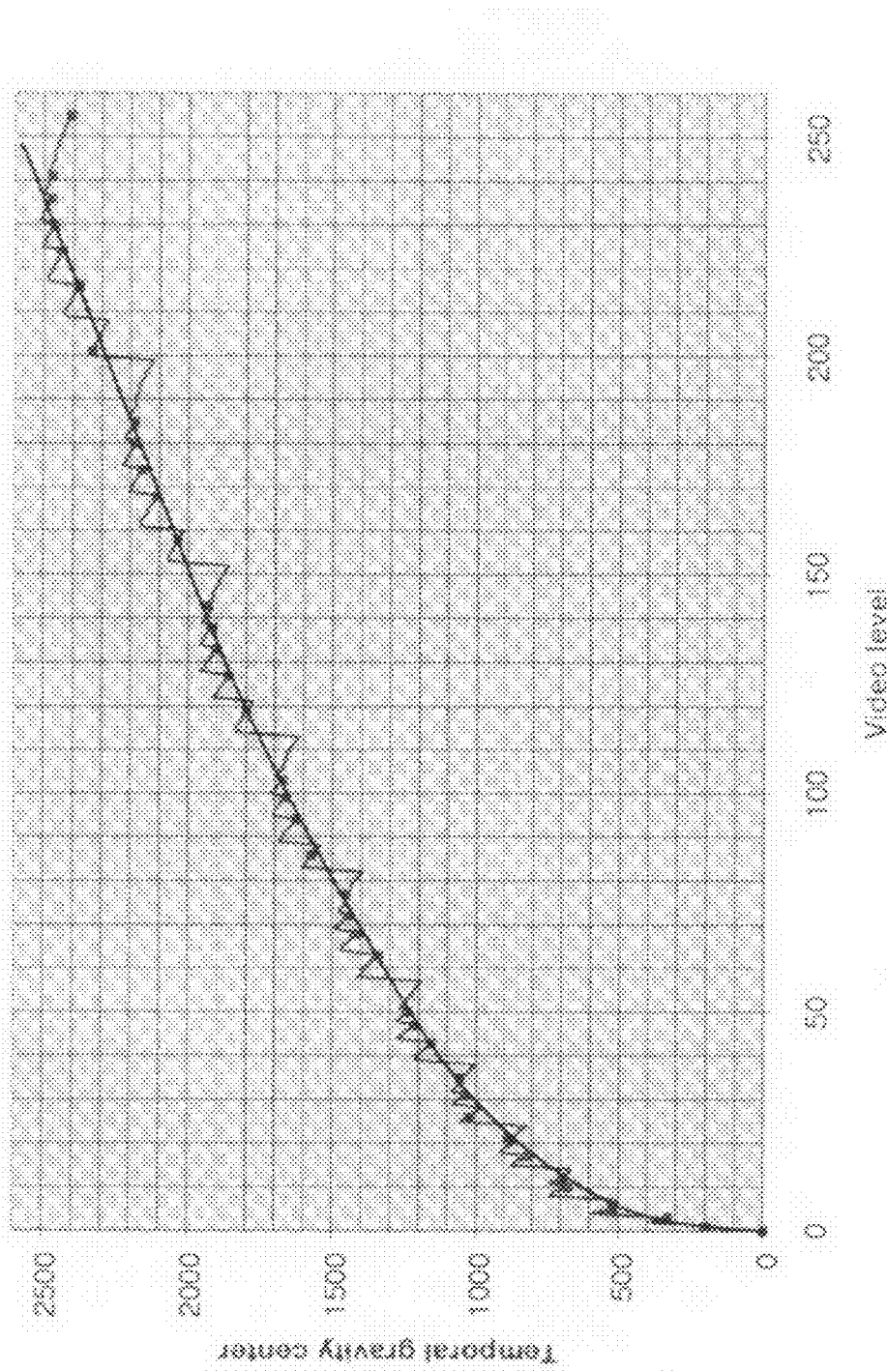
FIG. 5 the graph of FIG. 4 wherein a reduced number of video levels are chosen for GCC.
Figure 6:
FIG. 6 a picture representing a woman holding a glass wherein false contour effect is present on the skin areas of the woman.

FIG. 6 shows a picture representing a woman holding a glass wherein false contour effect is present on the skin areas of the woman.

Figure 7:
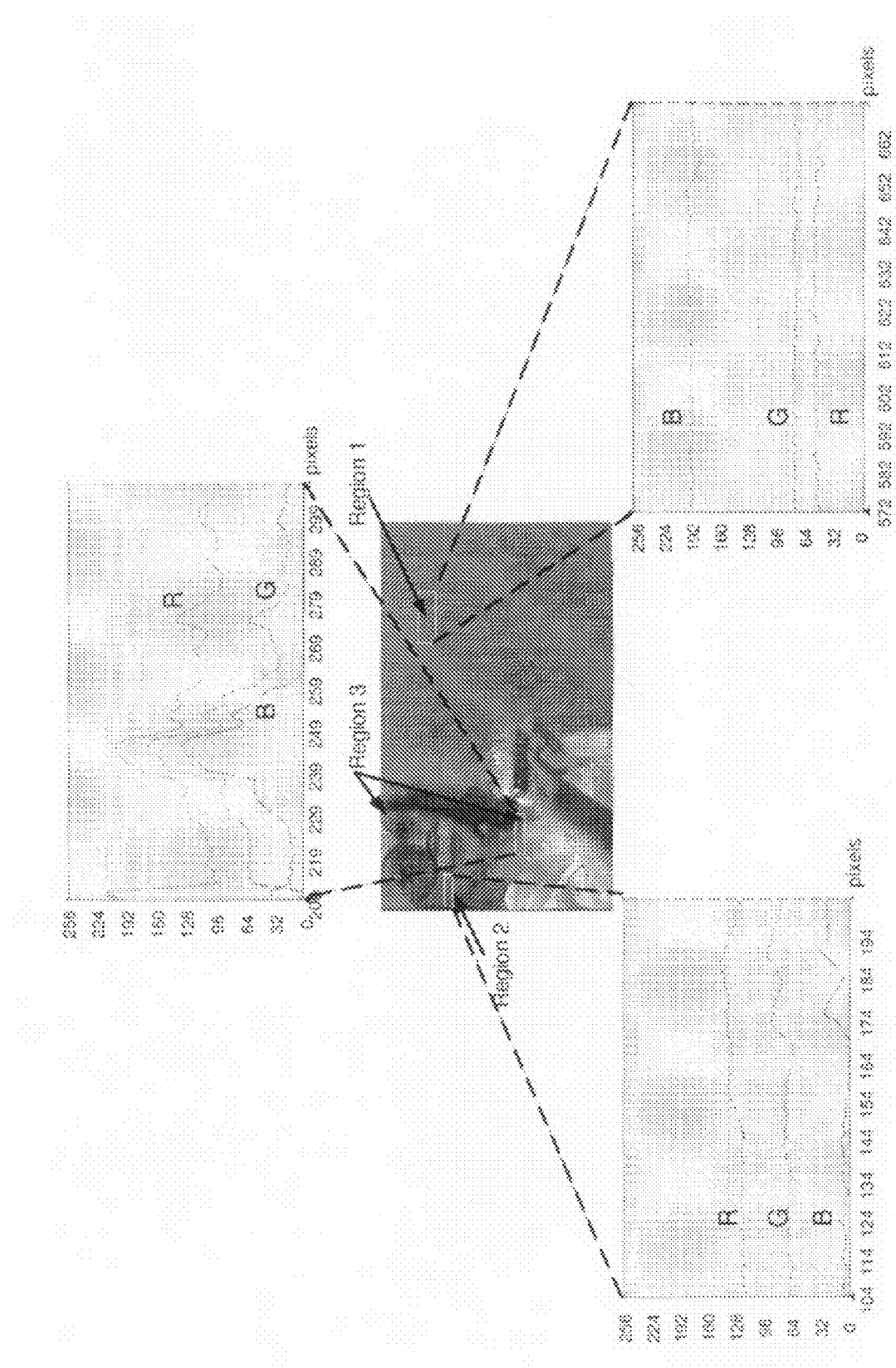
FIG. 7 the color components of three regions in the picture of FIG. 6.

As can be seen in FIG. 7, the picture of FIG. 6 can be divided in regions of different types. For example, in region 1 corresponding to a flat field, there is almost no noticeable change in the video level and the area is relatively big. Such a region usually does not suffer from dynamic false contour and can be coded with the maximum number of video levels available. On the other hand, a region with a smooth and gradual variation in the video level between the neighboring pixels, such as region 2, is more suitable to be coded with a code set that is optimized for such a case, for example a gravity center coding GCC as defined before. Finally, for region 3, where the transitions are sharper, it is best coded with a smaller carefully selected code set than that used in region 2. Of course by other criterion it is possible to define more than three regions to even improve the picture quality.

The invention is mainly a method to decide the best code available for each region in a general way regardless of the code set numbers. The main idea of the invention is to automatically change the floor and ceiling levels used for dithering each pixel value depending on the neighboring pixels of the same color component. Floor and ceiling values are defined at a later point in the specification. The size of the window determining the neighboring pixels to be taken for the decision is dependent on the definition of the wanted flat field size. According to the invention, the coding process and the dithering process are mixed.

The inventive method is applied to the video signal of a picture after being received and after the application of a gamma rescaling function (also called de-gamma function) on it.

Figure 9:
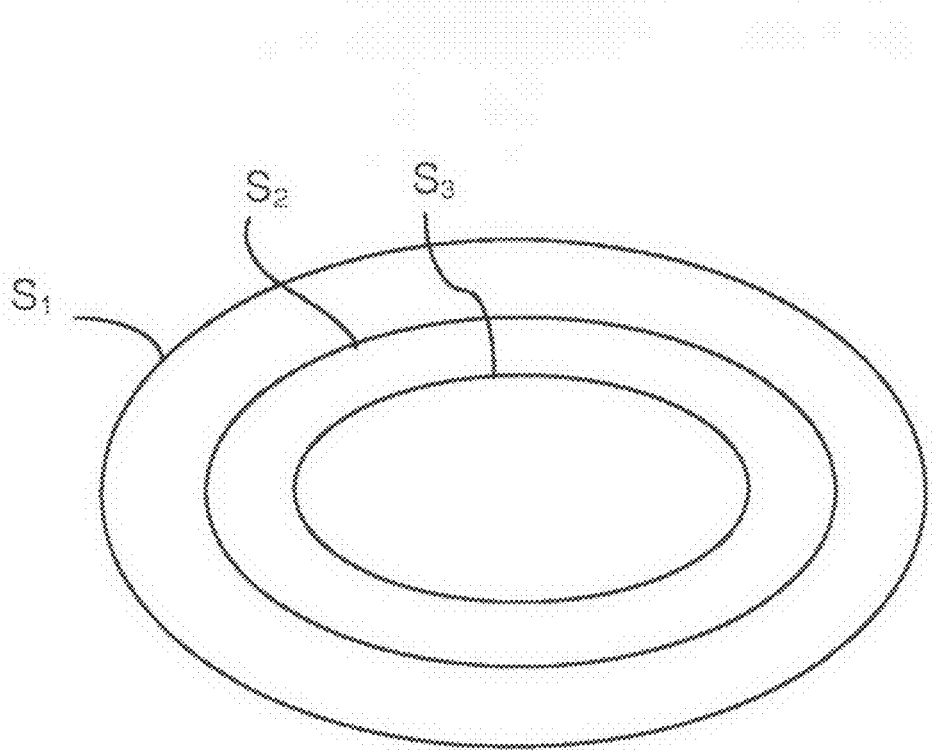
Figure 8A:
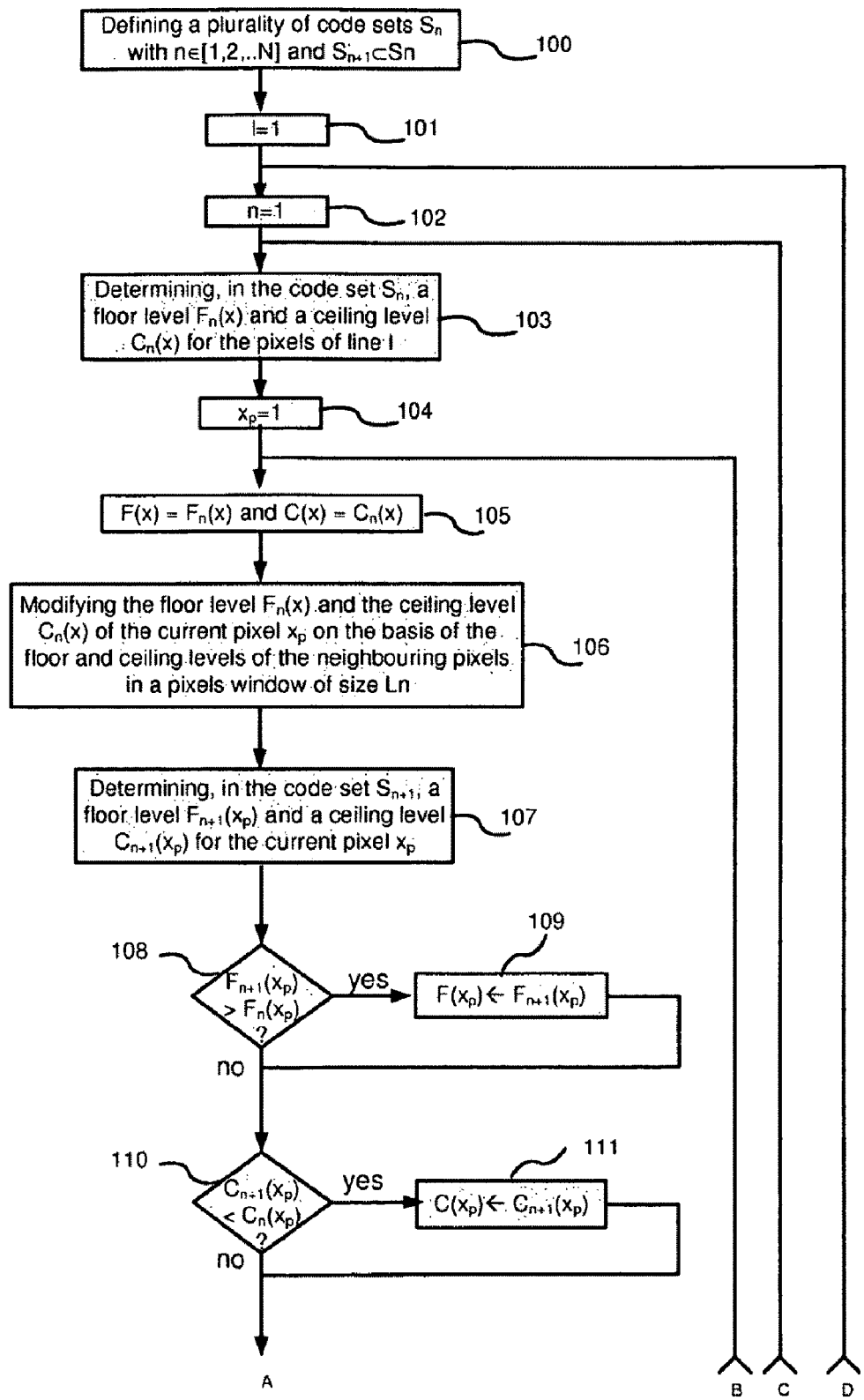
FIGS. 8A and 8B a flow chart of the adaptive coding method according to the invention FIG. 9 a code space (or set) organization with three sets of codes.
Figure 8B:
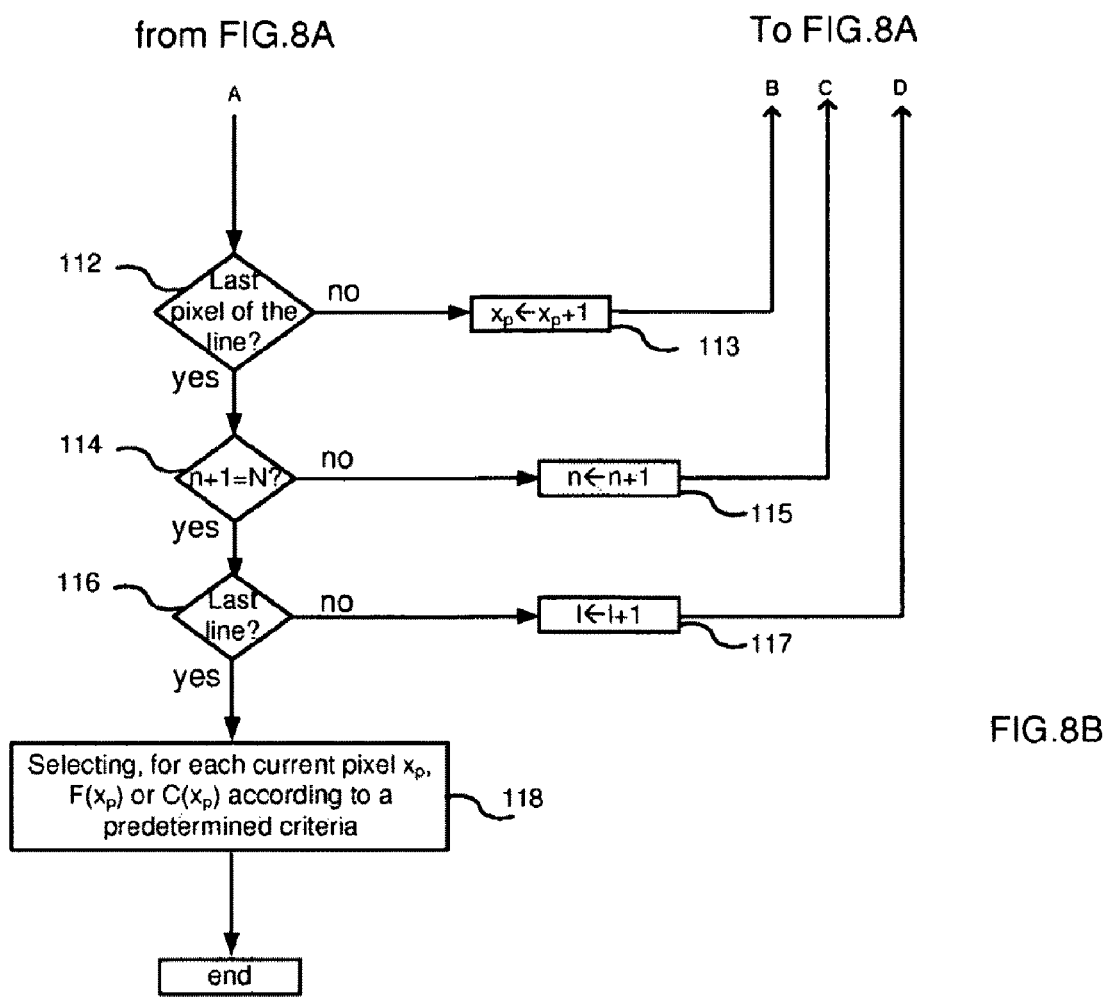

A flow chart of the inventive method is shown at FIGS. 8A and 8B. At a first step 100, a plurality of code sets $S_n$ are defined with $n \in [1, 2, \ldots N]$ and with $S_{n+1} \subset S_n$. For example, three code sets $S_1$, $S_2$ and $S_3$ are defined as shown in FIG. 9. The code set $S_1$ comprises for example 255 code words for coding the 255 video levels of a 8 bit video input. The code words are for example those given in Annex. The weights of the sub-fields associated to these codes are 1 2 3 5 8 12 18 27 41 58 80. The use of this code set in a region of the picture guarantees the best video quality for this region. It is used for regions having no video level variations over a relatively large area, typically regions like region 1. The code set $S_2$ is a subset of $S_1$. The code words of the code set $S_2$ are for example selected among the code words of the first code set according to the rule that the temporal centre of gravity for the light generation of the corresponding sub-field code words grows continuously with the video level of said code words apart from exceptions in the low video level range up tot a first predetermined limit and/or for in the high video level range from a second predetermined limit on. Such code words are for example the GCC code words given for the code set $S_2$ in the table given of the annex. In this example, $S_2$ comprises 38 code words. The code words of $S_2$ are used for coding regions like region 2 where the video levels vary smoothly and gradually. Finally, the code set $S_3$ is a subset of the code set $S_2$. An example of code set $S_3$ is also given in table of the annex. It comprises 11 code words. The code words of $S_3$ are used for coding regions like region 3 where the video level transitions are sharp. It is possible to define other code sets $S_n$. The only limitation is that the last code set can not be smaller in size than the number of subfields used in the driving scheme.

At steps 101 and 102, the parameter I of line and the parameter n are reinitialized.

In the following steps, floor levels and ceiling levels are defined to find the best code word to use. The floor level $F_n(x)$ for a pixel at a position x in a code set $S_n$ is the highest video level among the video levels corresponding to the code words of the code set $S_n$ equal to or lower than the video level of the pixel at the position x. For simplicity reasons, the pixel x will designate the pixel at the position x in the following specification. The ceiling level $C_n(x)$ for a pixel x in a code set $S_n$ is the lowest video level among the video levels corresponding to the code words of the code set $S_n$ equal to or higher than the video level of the pixel x. For example, if the video level of the pixel x is 145.9 and if the code sets of the annex table are used, we have:

$F_1(x)=145$ and $C_1(x)=146$
$F_2(X)=134$ and $C_2(X)=148$
$F_3(x)=105$ and $C_3(x)=163$ At the next step 103, a floor level $F_1(x)$ and a ceiling level $C_1(x)$ are determined in the code set $S_1$ for the line I of pixels. We obtain for example for 9 consecutive pixels, the table 1:

TABLE 1

| Ceiling level $C_1(x)$ | 132 | 146 | 145 | 149 | 146 | 161 | 159 | 160 | 157 |
|---|---|---|---|---|---|---|---|---|---|
| Current video level | 131.2 | 145.3 | 144.6 | 148.9 | 145.9 | 160.1 | 158.7 | 159.3 | 156.6 |
| Floor level $F_1(x)$ | 131 | 145 | 144 | 148 | 145 | 160 | 158 | 159 | 156 |

Then, the pixels are processed one by one successively. The current pixel $x_p$ is reinitialized at step 104. The floor level and the ceiling level, $F_1(x_p)$ and $C_1(x_p)$, are first taken as floor level and the ceiling level $F(x_p)$ and $C(x_p)$ of the current pixel $x_p$ at step 105. The levels $F(x_p)$ and $C(x_p)$ of the current pixel $x_p$ are then modified at step 106 on the basis of the floor and ceiling levels $F_1(x)$ and $C_1(x)$ of a number of neighbouring pixels, for example as following $$F(x_p)=\min(F_1(x_p), c_1[x_{p-L1/2}, x_{p+L1/2}])$$

$$C(x_p)=\max(C_1(x_p), f_1[x_{p-L1/2}, x_{p+L1/2}])$$

where:
 $F(x_p)$ and $C(x_p)$ are the modified floor and ceiling levels for the current pixel $x_p$;
 $F_n(x_p)$ and $C_n(x_p)$ are the floor and ceiling levels of the current pixel $x_p$;
 min (a,b) gives the minimum of the two values a or b as the output of the function;
 max(a,b) gives the maximum of the two values a or b as the output of the function; and
 $c_n[x_a, x_b]$ and $f_n[x_a, x_b]$ designate respectively the ceiling and floor levels in the set $S_n$ of all the pixels x between the two pixels $x_a$ and $x_b$; and
 Ln+1 is the size of the window defining the local working area of the present method in the set $S_n$ and including the current pixel and L neighbouring pixels.

The step 106 is illustrated by the following table 2. The fifth pixel is the current pixel $x_p$ and the levels corresponding to it are shown in bold characters. The window size is equal to 9 pixels. The result is $F(x_p)=132$ and $C(x_p)=160$:

TABLE 2

| Ceiling level | 132 | 146 | 145 | 149 | 160 | 161 | 159 | 160 | 157 |
|---|---|---|---|---|---|---|---|---|---|
| Current video level | 131.2 | 145.3 | 144.6 | 148.9 | 145.9 | 160.1 | 158.7 | 159.3 | 156.6 |
| Floor level | 131 | 145 | 144 | 148 | 132 | 160 | 158 | 159 | 156 |

At step 107, the floor level $F_2(x_p)$ and the ceiling level $C_2(x_p)$ of the current pixel $x_p$ are determined in the code set $S_2$: $F_2(x_p)=134$ and $C_2(x_p)=148$.

At steps 108 and 109, $F_2(x_p)$ is compared to $F(x_p)$ and $C_2(x_p)$ is compared to $C(x_p)$. If $F_2(x_p)>F(x_p)$ then $F_2(x_p)$ becomes $F(x_p)$ and at steps 110 and 111, if $C_2(x_p)<C(x_p)$ then $C_2(x_p)$ becomes $C(x_p)$.

In a general manner, after performing the modification of the floor and ceiling of the video levels in the code set $S_n$, a comparison between the modified floor and ceiling levels $F(x)$ and $C(x)$ and the nominal Floor and Ceiling $F_{n+1}(x)$ and $C_{n+1}(x)$ levels in the next code set (i.e. a smaller code set) for the same original video signal. If the modified floor value is smaller than the nominal value in the next code set, then the floor value is raised to the one in the next code set. The same idea is applied to the ceiling level with the difference that the smaller value in the next code set is selected.

In the previous example, we obtain for the fifth pixel:

TABLE 4

| Ceiling level | 132 | 146 | 145 | 149 | 149 | 161 | 159 | 160 | 157 |
|---|---|---|---|---|---|---|---|---|---|
| Current video level | 131.2 | 145.3 | 144.6 | 148.9 | 145.9 | 160.1 | 158.7 | 159.3 | 156.6 |
| Floor level | 131 | 145 | 144 | 148 | 135 | 160 | 158 | 159 | 156 |

All the pixels of the line I are thus processed until the last pixel of the line (steps 112 and 113). After applying this algorithm for the first time, for example with window size L1=9 as illustrated, the decision is taken between the code set $S_1$ and the second code set $S_2$. Areas of flat levels (almost no change in video level) tend to have similar ceiling and floor levels while those areas showing a gradient or changes in the video levels are adapted to suitable levels from the second code set.

At steps 114 and 115, the parameter n is incremented if n is not equal to N which is the number n associated to the smallest code set (N=3 in the example given here). The steps 103 to 113 are then applied again for the new parameter n, preferably with a smaller window size, for example L2=6. In the present case, the steps 103 to 113 with n=2. Since n+1=N=3, the steps 103 to 113 are made once. The line I is then incremented until the last pixel of the picture at steps 116 and 117.

At a step 118 (corresponding to a dithering step), a code word for each current pixel $x_p$ is selected among the code word of the floor level F(x$_p$) and the code word of the ceiling level C(x$_p$) according to a predetermined criteria.

This criteria is defined hereinafter in the paragraph related to the dithering block.

Description of the Device Implementation

Figure 10:
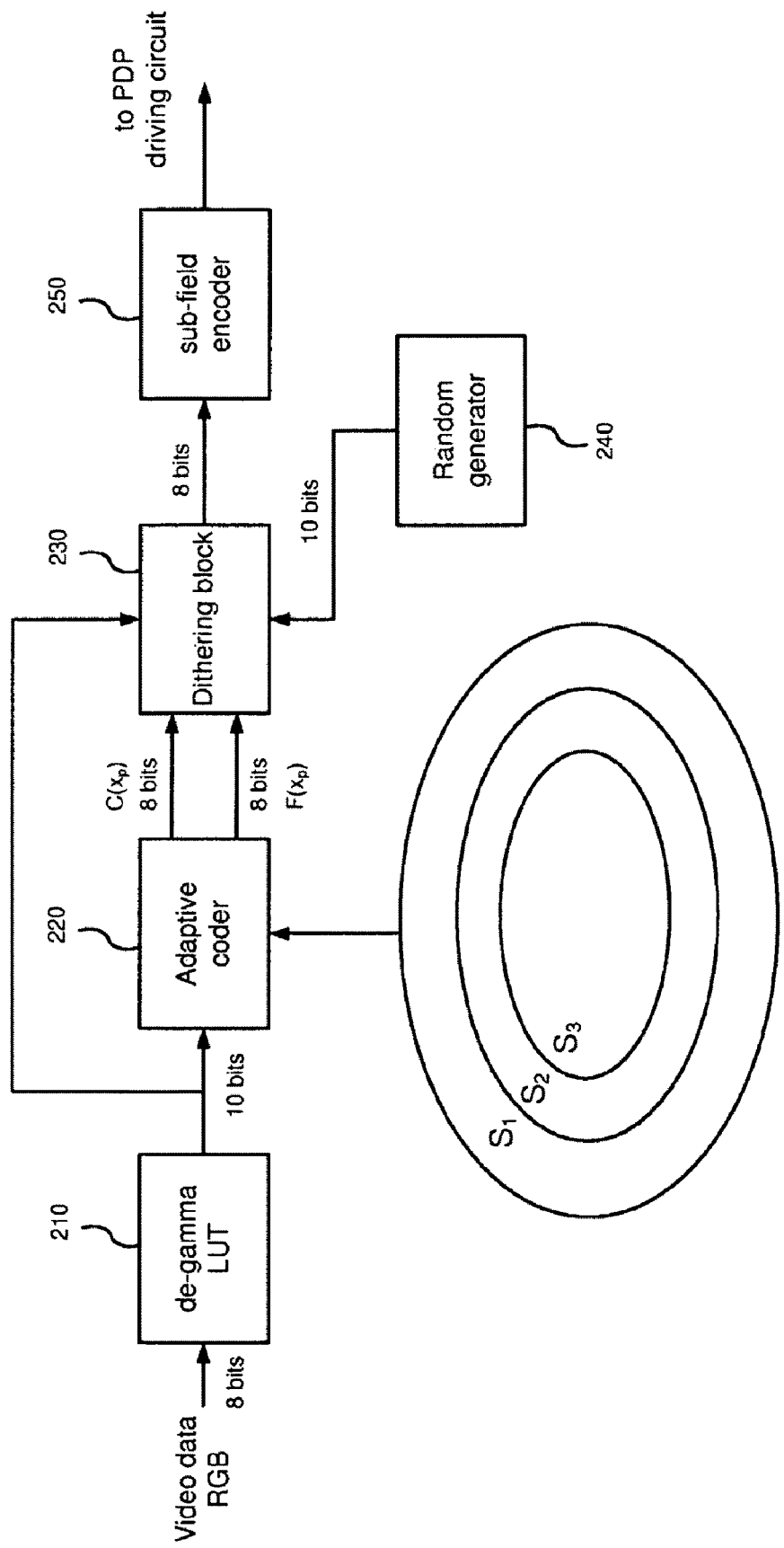
FIG. 10 a block diagram of a plasma display panel implementing the adaptive coding of the invention.

The input R, G, B color channels of the colored picture are is forwarded to the Gamma look up table (LUT) 210. The role of this LUT is to generate artificial gamma function to adjust the input video levels to achieve a display behavior suitable for the display used (a PDP for this case, for example). This is used because the transmitter stations are taking into account the CRT gamma behavior. The output as 10 bits is introduced as the input to an adaptive coder block 220, which is fed by a predetermined and optimized code sets (S$_1$, S$_2$ and S$_3$). The output of the adaptive coder 220 is the decided floor and ceiling levels F(x$_p$) and C(x$_p$) to be given to a dithering block 230 to portray the original color level. The output of the dithering block feed a classical subfield encoder 250, in the form of a coding LUT, and the output of this subfield encoder are the subfield data used to drive the screen. A random generator 240 is connected to the dithering block 230 to provide it a random number. This implementation is illustrated by the block diagram of FIG. 10.

Figure 11:
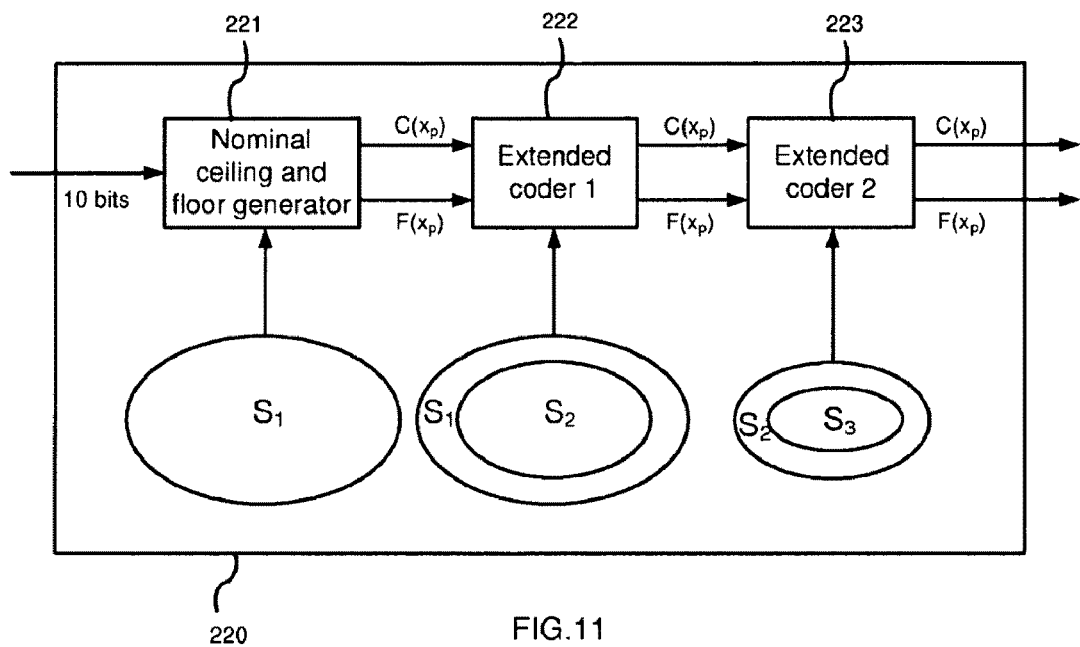
FIG. 11 a block diagram of an adaptive coder included in the block diagram of FIG. 10.
Figure 12:
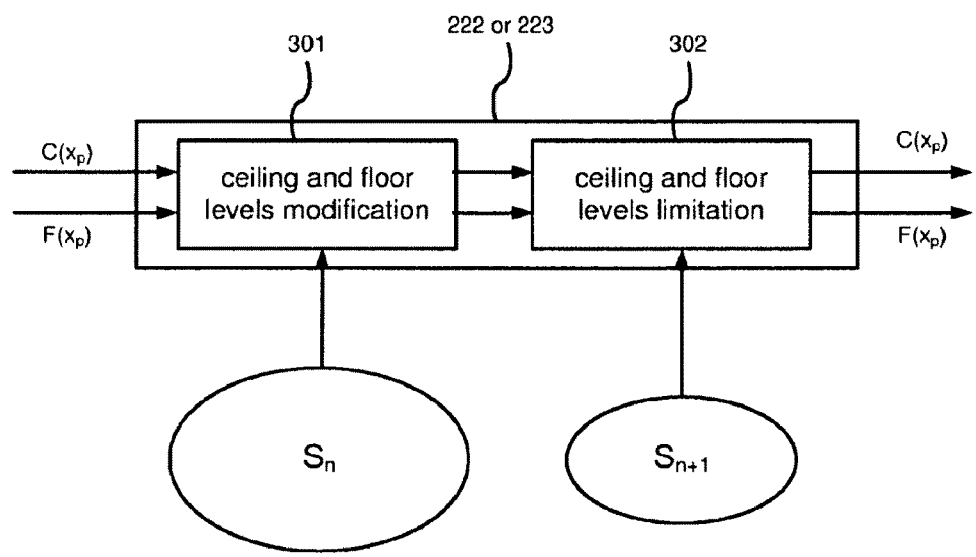
FIG. 12 a block diagram of an extended coder of the adaptive coder of FIG. 11.

The Adaptive Coder:

In the adaptive coder block 220, the input signal after being gamma corrected from look up table (LUT) values is used to decide the ceiling and the floor levels F(x$_p$) and C(x$_p$) for the dithering block. The block itself contains one or more extended coder blocks, as shown in FIG. 11. In the example of FIG. 11, the coder block 220 comprises a ceiling and floor level generator 221 for generating nominal ceiling and floor levels F(x$_p$) and C(x$_p$) (steps 103 and 105) using the code words of the code set S$_1$, a first extended coder 222 using the code words of the code sets S$_1$ and S$_2$ and a second extended coder 223 using the code words of the code sets S$_2$ and S$_3$. An extended coder block, detailed in FIG. 12, decides the ceiling and the floor levels F(x$_p$) and C(x$_p$) based on the input signal and the two code sets S$_n$ and S$_{n+1}$. Those intermediate outputs become the inputs for the next extended coder in addition to the original signal itself. More extended coders can be added depending on the code sets selected and the extended codes are cascaded. In FIG. 12, the extended coder block can be divided into two blocks: a block 300 for modifying the ceiling and floor levels as indicated by step 106 of FIGS. 8A-8B and a block 301 for limiting the ceiling and floor levels as indicated by steps 107 to 111 of FIGS. 8A-8B.

Figure 13:
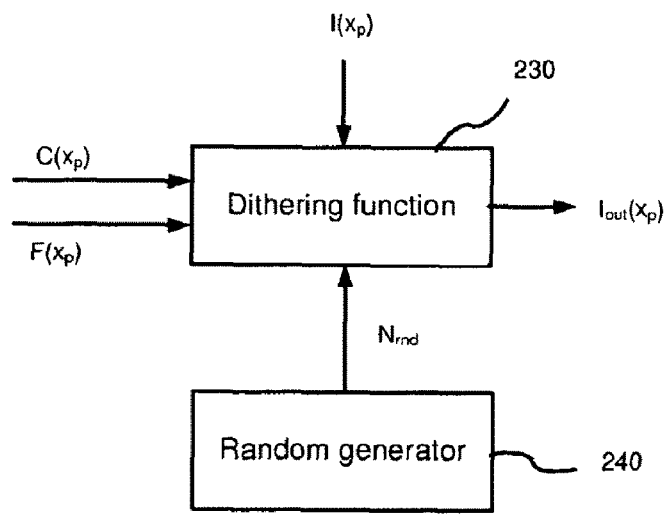
FIG. 13 a block diagram of dithering means of the plasma display panel of FIG. 10, and FIG. 14 a hardware-suitable block description of the dithering means.

The Dithering Block:

The main role of the dithering block 230 is to portray the original video level from the available input levels. The output of the system, as shown in FIG. 13, is one of the available two inputs, the ceiling level C(x$_p$) or the floor level F(x$_p$) coming from the adaptive coder 220. The decision of which value should be the output is based on the following steps:

1. Decide how often should each of the two input levels be selected as the output from the following equation:

$$I(x_p) = \alpha \cdot C(x_p) + (1-\alpha) \cdot F(x_p)$$

where:

I(x$_p$) is the original video level to be represented.
C(x$_p$) is the ceiling level of the video level of the pixel x$_p$.
F(x$_p$) is the floor level of the video level of the pixel x$_p$.
α is the weight factor resembling the participation of the ceiling level C(x$_p$) in the original video level value I(x$_p$), as a result the participation amount of the floor level F(x$_p$) is, of course, (1−α), (0≦α≦1).

Directly, α can be calculated as $$\alpha = \frac{I(x_p) - F(x_p)}{C(x_p) - F(x_p)}$$

2. Generate a normalized value output from the random generator N$_{rnd}$ (0≦N$_{rnd}$≦1) and using α as the decision threshold, the output of the dithering block, I$_{out}$(x$_p$), is:

$$\begin{cases} C(x_p) \rightarrow \alpha \geq N_{rnd} \\ F(x_p) \rightarrow \alpha \leq N_{rnd} \end{cases}$$

Hardware Implementation of the Dithering Function

Figure 14:
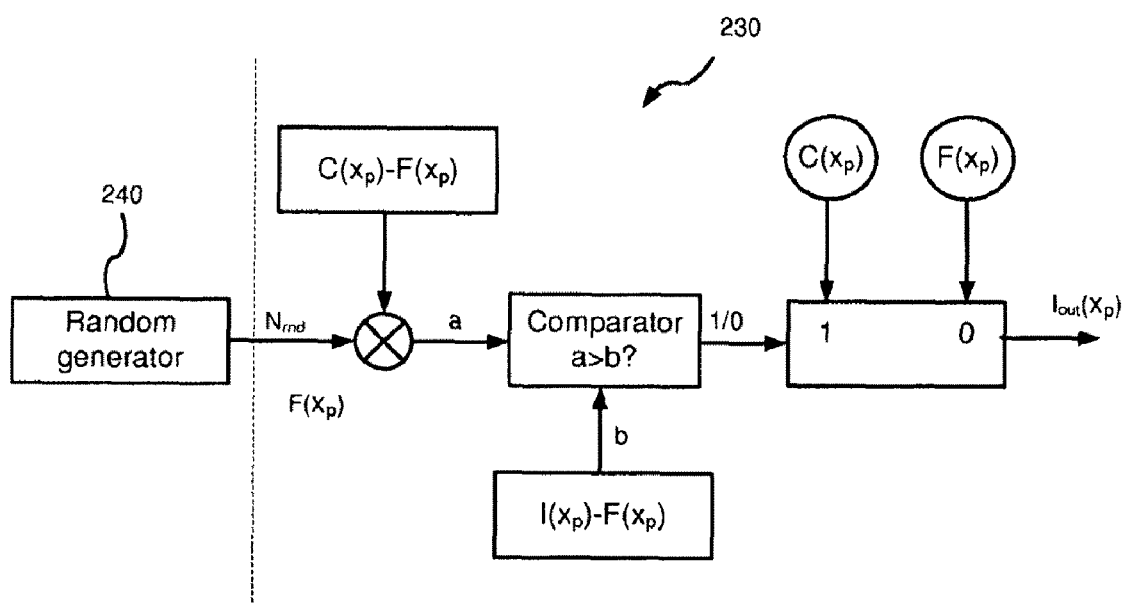

To implement α from the above mentioned equation, it is not favorable in the sense of hardware engineering to have a division function, the next hardware block description shows how to interpret the dithering function in a hardware favorable way which includes only comparators, multipliers, and adders/subtractors. FIG. 14 shows the block diagram of such an implementation.

ANNEX

| Gray level | Code word | Center of gravity | Code set S$_1$ | Code set S$_2$ | Code set S$_3$ |
|---|---|---|---|---|---|
| 0  | 0 0 0 0 0 0 0 0 0 0 | 0    | X | X | X |
| 1  | 1 0 0 0 0 0 0 0 0 0 | 575  | X | X | X |
| 2  | 0 1 0 0 0 0 0 0 0 0 | 1160 | X | X |   |
| 3  | 1 1 0 0 0 0 0 0 0 0 | 965  | X |   |   |
| 4  | 1 0 1 0 0 0 0 0 0 0 | 1460 | X | X | X |
| 5  | 0 1 1 0 0 0 0 0 0 0 | 1517 | X | X |   |
| 6  | 1 1 1 0 0 0 0 0 0 0 | 1360 | X |   |   |
| 7  | 0 1 0 1 0 0 0 0 0 0 | 2020 | X |   |   |
| 8  | 1 1 0 1 0 0 0 0 0 0 | 1840 | X | X |   |
| 9  | 1 0 1 1 0 0 0 0 0 0 | 1962 | X | X | X |
| 10 | 0 1 1 1 0 0 0 0 0 0 | 1941 | X |   |   |
| 11 | 1 1 1 1 0 0 0 0 0 0 | 1816 | X |   |   |
| 12 | 1 0 1 0 1 0 0 0 0 0 | 2486 | X |   |   |
| 13 | 0 1 1 0 1 0 0 0 0 0 | 2429 | X |   |   |
| 14 | 1 1 1 0 1 0 0 0 0 0 | 2297 | X | X |   |
| 15 | 0 1 0 1 1 0 0 0 0 0 | 2543 | X |   |   |
| 16 | 1 1 0 1 1 0 0 0 0 0 | 2420 | X | X |   |
| 17 | 1 0 1 1 1 0 0 0 0 0 | 2450 | X | X | X |
| 18 | 0 1 1 1 1 0 0 0 0 0 | 2411 | X |   |   |
| 19 | 1 1 1 1 1 0 0 0 0 0 | 2315 | X |   |   |
| 20 | 1 1 0 1 0 1 0 0 0 0 | 2938 | X |   |   |
| 21 | 1 0 1 1 0 1 0 0 0 0 | 2938 | X |   |   |
| 22 | 0 1 1 1 0 1 0 0 0 0 | 2884 | X |   |   |
| 23 | 1 1 1 1 0 1 0 0 0 0 | 2783 | X | X |   |
| 24 | 1 0 1 0 1 1 0 0 0 0 | 3078 | X |   |   |
| 25 | 0 1 1 0 1 1 0 0 0 0 | 3025 | X |   |   |
| 26 | 1 1 1 0 1 1 0 0 0 0 | 2930 | X | X |   |
| 27 | 0 1 0 1 1 1 0 0 0 0 | 3043 | X |   |   |
| 28 | 1 1 0 1 1 1 0 0 0 0 | 2955 | X | X |   |
| 29 | 1 0 1 1 1 1 0 0 0 0 | 2955 | X |   |   |
| 30 | 0 1 1 1 1 1 0 0 0 0 | 2915 | X |   |   |
| 31 | 1 1 1 1 1 1 0 0 0 0 | 2839 | X |   |   |
| 32 | 1 1 1 0 1 0 1 0 0 0 | 3474 | X |   |   |
| 33 | 0 1 0 1 1 0 1 0 0 0 | 3550 | X |   |   |
| 34 | 1 1 0 1 1 0 1 0 0 0 | 3462 | X |   |   |
| 35 | 1 0 1 1 1 0 1 0 0 0 | 3448 | X |   |   |
| 36 | 0 1 1 1 1 0 1 0 0 0 | 3400 | X |   |   |
| 37 | 1 1 1 1 1 0 1 0 0 0 | 3324 | X | X | X |
| 38 | 1 1 0 1 1 1 1 0 0 0 | 3625 | X |   |   |
| 39 | 1 0 1 1 1 1 1 0 0 0 | 3608 | X |   |   |
| 40 | 0 1 1 1 0 1 1 0 0 0 | 3561 | X |   |   |
| 41 | 1 1 1 1 0 1 1 0 0 0 | 3488 | X | X |   |
| 42 | 1 0 1 0 1 1 1 0 0 0 | 3640 | X |   |   |
| 43 | 0 1 1 0 1 1 1 0 0 0 | 3596 | X |   |   |
| 44 | 1 1 1 0 1 1 1 0 0 0 | 3527 | X | X |   |
| 45 | 0 1 0 1 1 1 1 0 0 0 | 3582 | X | X |   |
| 46 | 1 1 0 1 1 1 1 0 0 0 | 3516 | X |   |   |

ANNEX

| Gray level | Code word | Center of gravity | Code set $S_1$ | Code set $S_2$ | Code set $S_3$ |
|---|---|---|---|---|---|
| 47 | 10111110000 | 3504 | X | | |
| 48 | 01111110000 | 3468 | X | | |
| 49 | 11111110000 | 3409 | X | | |
| 50 | 11110101000 | 4080 | X | | |
| 51 | 10101101000 | 4193 | X | | |
| 52 | 01101101000 | 4146 | X | | |
| 53 | 11101101000 | 4079 | X | | |
| 54 | 01011101000 | 4114 | X | | |
| 55 | 11011101000 | 4050 | X | | |
| 56 | 10111101000 | 4030 | X | | |
| 57 | 01111101000 | 399 | X | | |
| 58 | 11111101000 | 3931 | X | X | |
| 59 | 11101011000 | 4257 | X | | |
| 60 | 01011011000 | 4286 | X | | |
| 61 | 11011011000 | 4225 | X | | |
| 62 | 10111011000 | 4204 | X | | |
| 63 | 01111011000 | 4165 | X | | |
| 64 | 11111011000 | 4109 | X | X | X |
| 65 | 11010111000 | 4273 | X | | |
| 66 | 10110111000 | 4253 | X | | |
| 67 | 01110111000 | 4215 | X | | |
| 68 | 11110111000 | 4162 | X | X | |
| 69 | 10101111000 | 4244 | X | | |
| 70 | 01101111000 | 4209 | X | X | |
| 71 | 11101111000 | 4157 | X | | |
| 72 | 01011111000 | 4183 | X | | |
| 73 | 11011111000 | 4133 | X | | |
| 74 | 10111111000 | 4117 | X | | |
| 75 | 01111111000 | 4086 | X | | |
| 76 | 11111111000 | 4040 | X | | |
| 77 | 01111010100 | 4835 | X | | |
| 78 | 11111010100 | 4780 | X | | |
| 79 | 11010110100 | 4907 | X | | |
| 80 | 10110110100 | 4882 | X | | |
| 81 | 01110110100 | 4844 | X | | |
| 82 | 11110110100 | 4791 | X | | |
| 83 | 10101110100 | 4852 | X | | |
| 84 | 01101110100 | 4815 | X | | |
| 85 | 11101110100 | 4766 | X | | |
| 86 | 01011110100 | 4780 | X | | |
| 87 | 11011110100 | 4731 | X | | |
| 88 | 10111110100 | 4711 | X | | |
| 89 | 01111110100 | 4678 | X | | |
| 90 | 11111110100 | 4632 | X | X | |
| 91 | 11110101100 | 4988 | X | | |
| 92 | 10101101100 | 5040 | X | | |
| 93 | 01101101100 | 5005 | X | | |
| 94 | 11101101100 | 4958 | X | | |
| 95 | 01011101100 | 4969 | X | | |
| 96 | 11011101100 | 4923 | X | | |
| 97 | 10111101100 | 4903 | X | | |
| 98 | 01111101100 | 4870 | X | | |
| 99 | 11111101100 | 4827 | X | X | |
| 100 | 11101011100 | 5010 | X | | |
| 101 | 01011011100 | 5020 | X | | |
| 102 | 11011011100 | 4976 | X | | |
| 103 | 10111011100 | 4957 | X | | |
| 104 | 01111011100 | 4926 | X | | |
| 105 | 11111011100 | 4884 | X | X | X |
| 106 | 11010111100 | 4978 | X | | |
| 107 | 10110111100 | 4959 | X | | |
| 108 | 01110111100 | 4929 | X | | |
| 109 | 11110111100 | 4889 | X | X | |
| 110 | 10101111100 | 4934 | X | | |
| 111 | 01101111100 | 4905 | X | X | |
| 112 | 11101111100 | 4867 | X | | |
| 113 | 01011111100 | 4876 | X | | |
| 114 | 11011111100 | 4839 | X | | |
| 115 | 10111111100 | 4822 | X | | |
| 116 | 01111111100 | 4796 | X | | |
| 117 | 11111111100 | 4760 | X | | |
| 118 | 01011011010 | 5698 | X | | |
| 119 | 11011011010 | 5655 | X | | |
| 120 | 10111011010 | 5633 | X | | |
| 121 | 01111011010 | 5600 | X | | |
| 122 | 11111011010 | 5559 | X | | |
| 123 | 11010111010 | 5634 | X | | |
| 124 | 10110111010 | 5612 | X | | |
| 125 | 01110111010 | 5581 | X | | |
| 126 | 11110111010 | 5542 | X | | |
| 127 | 10101111010 | 5576 | X | | |
| 128 | 01101111010 | 5546 | X | | |
| 129 | 11101111010 | 5507 | X | | |
| 130 | 01011111010 | 5511 | X | | |
| 131 | 11011111010 | 5473 | X | | |
| 132 | 10111111010 | 5454 | X | | |
| 133 | 01111111010 | 5426 | X | | |
| 134 | 11111111010 | 5390 | X | X | |
| 135 | 01111010110 | 5834 | X | | |
| 136 | 11111010110 | 5795 | X | | |
| 137 | 11010110110 | 5860 | X | | |
| 138 | 10110110110 | 5839 | X | | |
| 139 | 01110110110 | 5810 | X | | |
| 140 | 11110110110 | 5773 | X | | |
| 141 | 10101110110 | 5801 | X | | |
| 142 | 01101110110 | 5773 | X | | |
| 143 | 11101110110 | 5737 | X | | |
| 144 | 01011110110 | 5738 | X | | |
| 145 | 11011110110 | 5703 | X | | |
| 146 | 10111110110 | 5684 | X | | |
| 147 | 01111110110 | 5657 | X | | |
| 148 | 11111110110 | 5623 | X | X | |
| 149 | 11110101110 | 5833 | X | | |
| 150 | 10101101110 | 5860 | X | | |
| 151 | 01101101110 | 5833 | X | | |
| 152 | 01011101110 | 5798 | X | | |
| 153 | 01011101110 | 5799 | X | | |
| 154 | 11011101110 | 5765 | X | | |
| 155 | 10111101110 | 5747 | X | | |
| 156 | 01111101110 | 5721 | X | | |
| 157 | 11111101110 | 5689 | X | X | |
| 158 | 11101011110 | 5799 | X | | |
| 159 | 01011011110 | 5800 | X | | |
| 160 | 11011011110 | 5768 | X | | |
| 161 | 10111011110 | 5750 | X | | |
| 162 | 01111011110 | 5725 | X | | |
| 163 | 11111011110 | 5694 | X | X | X |
| 164 | 11010111110 | 5749 | X | | |
| 165 | 10110111110 | 5732 | X | | |
| 166 | 01110111110 | 5708 | X | X | |
| 167 | 11110111110 | 5677 | X | | |
| 168 | 10101111110 | 5702 | X | | |
| 169 | 01101111110 | 5679 | X | | |
| 170 | 01011111110 | 5649 | X | | |
| 171 | 01011111110 | 5651 | X | | |
| 172 | 11011111110 | 5621 | X | | |
| 173 | 10111111110 | 5606 | X | | |
| 174 | 01111111110 | 5584 | X | | |
| 175 | 11111111110 | 5555 | X | | |
| 176 | 11011101101 | 6512 | X | | |
| 177 | 10111101101 | 6492 | X | | |
| 178 | 01111101101 | 6465 | X | | |
| 179 | 11111101101 | 6433 | X | | |
| 180 | 11101011101 | 6525 | X | | |
| 181 | 01011011101 | 6522 | X | | |
| 182 | 11011011101 | 6490 | X | | |
| 183 | 10111011101 | 6470 | X | | |
| 184 | 01111011101 | 6445 | X | | |
| 185 | 11111011101 | 6413 | X | | |
| 186 | 11010111101 | 6458 | X | | |
| 187 | 10110111101 | 6439 | X | | |
| 188 | 01110111101 | 6414 | X | | |
| 189 | 11110111101 | 6383 | X | | |
| 190 | 10101111101 | 6402 | X | | |
| 191 | 01101111101 | 6377 | X | | |
| 192 | 11101111101 | 6347 | X | | |
| 193 | 01011111101 | 6345 | X | | |
| 194 | 11011111101 | 6315 | X | | |
| 195 | 10111111101 | 6298 | X | | |
| 196 | 01111111101 | 6275 | X | | |

ANNEX

| Gray level | Code word | Center of gravity | Code set $S_1$ | Code set $S_2$ | Code set $S_3$ |
|---|---|---|---|---|---|
| 197 | 1 1 1 1 1 1 1 1 0 1 | 6246 | X | X | |
| 198 | 0 1 0 1 1 0 1 1 0 1 1 | 6798 | X | | |
| 199 | 1 1 0 1 1 0 1 1 0 1 1 | 6766 | X | | |
| 200 | 1 0 1 1 1 0 1 1 0 1 1 | 6747 | X | | |
| 201 | 0 1 1 1 1 0 1 1 0 1 1 | 6722 | X | | |
| 202 | 1 1 1 1 1 0 1 1 0 1 1 | 6692 | X | | |
| 203 | 1 1 0 1 0 1 1 1 0 1 1 | 6732 | X | | |
| 204 | 1 0 1 1 0 1 1 1 0 1 1 | 6713 | X | | |
| 205 | 0 1 1 1 0 1 1 1 0 1 1 | 6689 | X | | |
| 206 | 1 1 1 1 0 1 1 1 0 1 1 | 6659 | X | | |
| 207 | 1 0 1 0 1 1 1 1 0 1 1 | 6675 | X | | |
| 208 | 0 1 1 0 1 1 1 1 0 1 1 | 6651 | X | | |
| 209 | 1 1 1 0 1 1 1 1 0 1 1 | 6622 | X | | |
| 210 | 0 1 0 1 1 1 1 1 0 1 1 | 6619 | X | | |
| 211 | 1 1 0 1 1 1 1 1 0 1 1 | 6590 | X | | |
| 212 | 1 0 1 1 1 1 1 1 0 1 1 | 6573 | X | | |
| 213 | 0 1 1 1 1 1 1 1 0 1 1 | 6550 | X | | |
| 214 | 1 1 1 1 1 1 1 1 0 1 1 | 6522 | X | X | |
| 215 | 0 1 1 1 1 0 1 0 1 1 1 | 6796 | X | | |
| 216 | 1 1 1 1 1 0 1 0 1 1 1 | 6767 | X | | |
| 217 | 1 1 0 1 0 1 1 0 1 1 1 | 6804 | X | | |
| 218 | 1 0 1 1 0 1 1 0 1 1 1 | 6786 | X | | |
| 219 | 0 1 1 1 0 1 1 0 1 1 1 | 6763 | X | | |
| 220 | 1 1 1 1 0 1 1 0 1 1 1 | 6735 | X | | |
| 221 | 1 0 1 0 1 1 1 0 1 1 1 | 6749 | X | | |
| 222 | 0 1 1 0 1 1 1 0 1 1 1 | 6727 | X | | |
| 223 | 1 1 1 0 1 1 1 0 1 1 1 | 6699 | X | | |
| 224 | 0 1 0 1 1 1 1 0 1 1 1 | 6696 | X | | |
| 225 | 1 1 0 1 1 1 1 0 1 1 1 | 6669 | X | | |
| 226 | 1 0 1 1 1 1 1 0 1 1 1 | 6652 | X | | |
| 227 | 0 1 1 1 1 1 1 0 1 1 1 | 6631 | X | | |
| 228 | 1 1 1 1 1 1 1 0 1 1 1 | 6604 | X | X | |
| 229 | 1 1 1 1 0 1 0 1 1 1 1 | 6737 | X | | |
| 230 | 1 0 1 0 1 1 0 1 1 1 1 | 6750 | X | | |
| 231 | 0 1 1 0 1 1 0 1 1 1 1 | 6728 | X | | |
| 232 | 1 1 1 0 1 1 0 1 1 1 1 | 6702 | X | | |
| 233 | 0 1 0 1 1 1 0 1 1 1 1 | 6699 | X | | |
| 234 | 1 1 0 1 1 1 0 1 1 1 1 | 6673 | X | | |
| 235 | 1 0 1 1 1 1 0 1 1 1 1 | 6657 | X | | |
| 236 | 0 1 1 1 1 1 0 1 1 1 1 | 6636 | X | | |
| 237 | 1 1 1 1 1 1 0 1 1 1 1 | 6610 | X | X | |
| 238 | 1 1 1 0 1 0 1 1 1 1 1 | 6680 | X | | |
| 239 | 0 1 0 1 1 0 1 1 1 1 1 | 6677 | X | | |
| 240 | 1 1 0 1 1 0 1 1 1 1 1 | 6652 | X | | |
| 241 | 1 0 1 1 1 0 1 1 1 1 1 | 6636 | X | | |
| 242 | 0 1 1 1 1 0 1 1 1 1 1 | 6616 | X | X | X |
| 243 | 1 1 1 1 1 0 1 1 1 1 1 | 6591 | X | | |
| 244 | 1 1 0 1 0 1 1 1 1 1 1 | 6625 | X | X | |
| 245 | 1 0 1 1 0 1 1 1 1 1 1 | 6610 | X | | |
| 246 | 0 1 1 1 0 1 1 1 1 1 1 | 6590 | X | | |
| 247 | 1 1 1 1 0 1 1 1 1 1 1 | 6566 | X | | |
| 248 | 1 0 1 0 1 1 1 1 1 1 1 | 6579 | X | | |
| 249 | 0 1 1 0 1 1 1 1 1 1 1 | 6559 | X | | |
| 250 | 1 1 1 0 1 1 1 1 1 1 1 | 6535 | X | | |
| 251 | 0 1 0 1 1 1 1 1 1 1 1 | 6533 | X | | |
| 252 | 1 1 0 1 1 1 1 1 1 1 1 | 6510 | X | | |
| 253 | 1 0 1 1 1 1 1 1 1 1 1 | 6496 | X | | |
| 254 | 0 1 1 1 1 1 1 1 1 1 1 | 6477 | X | | |
| 255 | 1 1 1 1 1 1 1 1 1 1 1 | 6454 | X | X | X |

The invention claimed is:

1. A method for coding the video level of a current pixel of a colour component of a picture to be displayed on a display device into a code word belonging to at least a first code set or a second code set or both, the second code set being a subset of the first code set, the code words of the second code set being selected among the code words of the first code set according to the rule that the temporal centre of gravity for the light generation of the corresponding sub-field code words grows continuously with the video level of said code words by selecting certain levels, with an exception in which the temporal centre of gravity does not grow continuously in the low video level range up to a first predetermined number of low level code words or in the high video level range from a second predetermined number of high level code words or in both, comprising:
determining, by an adaptive coder, for a predetermined number of neighbouring pixels belonging to a window including said current pixel, at least a first floor level and a first ceiling level that can be coded by a code word of the first code set and a second floor level and a second ceiling level that can be coded by a code word of the second code set, the first and second floor levels being respectively the highest video level among the video levels corresponding to the code words of the first and second code sets equal to or lower than the video level of the current pixel and the first and second ceiling levels being respectively the lowest video level among the video levels corresponding to the code words of the first and second code sets equal to or higher than the video level of the current pixel, determining, for said current pixel, the minimum level between the first floor level of said current pixel and the ceiling levels of said predetermined number of neighbouring pixels of the window including the current pixel and determining for said current pixel the maximum level between the first ceiling level of said current pixel and the floor levels of said predetermined number of neighbouring pixels, said minimum level being called floor level of the current pixel and said maximum level being called ceiling level of the current pixel, substituting, for said current pixel, the floor level by the second floor level if the said floor level is lower than the second floor level and the ceiling level by the second ceiling level if said ceiling level is higher than the second ceiling level, and selecting, for said current pixel, the code word among the code word of the floor level and the code word of the ceiling level according to dithering for coding the video level of the current pixel.

2. The method according to claim 1, further comprising encoding, for said current pixel, the selected code word into a subfield code word, wherein to each bit of the subfield code word a certain duration is assigned, hereinafter called sub-field, during which a pixel can be activated for light generation.

3. The method according to claim 1, wherein the selecting the code word of the current pixel among the code word of the floor level and the code word of the ceiling level according to dithering comprises the following:

computing a coefficient $\alpha$ such that $\alpha=[l(x)-f(x)]/[c(x)-f(x)]$ where
$l(x)$ is the video level of the current pixel x,
$C(x_p)$ is the ceiling level of the current pixel,
$F(x_p)$ is the floor level of the current pixel, and
$\alpha$ is a weight factor resembling the participation of $C(x_p)$ in $l(x)$, generating a random number $N_{rnd}$ such that $0 \leq N_{rnd} \leq 1$,
selecting the ceiling level if the coefficient $\alpha$ is greater than or equal to $N_{rnd}$ and selecting the floor level if the coefficient $\alpha$ is lower than the random number $N_{rnd}$.

4. A device for coding the video level of a current pixel of a colour component of a picture to be displayed on a display device into a code word belonging to at least a first code set or a second code set or both, the second code set being a subset of the first code set, the code words of the second code set being selected among the code words of the first code set according to the rule that the temporal centre of gravity for the light generation of the corresponding sub-field code words grows continuously by selecting certain levels, with the video level of said code words with an exception in which the temporal centre of gravity does not grow continuously in the low video level range up to a first predetermined number of low level code words or in the high video level range from a second predetermined number of high level code words or in both,
    comprising:
        means for determining, for a predetermined number of neighbouring pixels belonging to a window including said current pixel, at least a first floor level and a first ceiling level coded by a code word of the first code set and a second floor level and a second ceiling level coded by a code word of the second code set, the first and second floor levels being respectively the highest video level among the video levels corresponding to the code words of the first and second code sets equal to or lower than the video level of the current pixel and the first and second ceiling levels being respectively the lowest video level among the video levels corresponding to the code words of the first and second code sets equal to or higher than the video level of the current pixel,
        means for determining, for said current pixel, the minimum level between the first floor level of said current pixel and the ceiling levels of said predetermined number of neighbouring pixels of the window including the current pixel and determining, for said current pixel, the maximum level between the first ceiling level of said current pixel and the floor levels of said predetermined number of neighbouring pixels, said minimum level being called floor level of the current pixel and said maximum level being called ceiling level of the current pixel,
        means for substituting, for said current pixel, the floor level by the second floor level if the current floor level is lower than the second floor level and the ceiling level by the second ceiling level if said ceiling level is higher than the second ceiling level, and
        dithering means for selecting, for said current pixel, the code word among the code word of the floor level and the code word of the ceiling level according to dithering for coding the video level of the current pixel.

5. The device according to claim 4, further comprising subfield encoding means for encoding, for said current pixel, the selected code word into a subfield code word, wherein to each bit of the subfield code word a certain duration is assigned, hereinafter called sub-field, during which a pixel can be activated for light generation.

6. The device according to claim 4, wherein the dithering means comprises:
    means for computing a coefficient $\alpha$ such that $\alpha=[l(x)-f(x)]/[c(x)-f(x)]$ where
        $l(x)$ is the video level of the current pixel x,
        $c(x)$ is the ceiling level of the current pixel,
        $f(x)$ is the floor level of the current pixel, and
        $\alpha$ is a weight factor resembling the participation of $C(x_p)$ in $l(x)$,
    means for generating a random number $N_{rnd}$ such that $0 \leq N_{rnd} \leq 1$,
    means for selecting the ceiling level if the coefficient $\alpha$ is greater than or equal to $N_{rnd}$ and selecting the floor level if the coefficient $\alpha$ is lower than the random number $N_{rnd}$.

* * * * *